United States Patent
Chenoweth et al.

[19]

[11] Patent Number: 6,019,394
[45] Date of Patent: Feb. 1, 2000

[54] MULTIPLE FUNCTION INTERACTIVE PRODUCT LABEL

[75] Inventors: Stephen V. Chenoweth, Dayton; Jerome A. Otto, Centerville; Donald C. Johnson, Kettering, all of Ohio

[73] Assignee: NCR Corporation, Dayton, Ohio

[21] Appl. No.: 08/234,450

[22] Filed: Apr. 28, 1994

[51] Int. Cl.[7] ............................................. B42D 15/00
[52] U.S. Cl. .................... 283/81; 283/82; 340/825.1; 340/825.15; 235/492; 235/493
[58] Field of Search ............................. 283/81, 82, 83; 340/825.1, 825.15; 235/492, 487, 493

[56] References Cited

U.S. PATENT DOCUMENTS

| | | | |
|---|---|---|---|
| 4,223,830 | 9/1980 | Walton | 235/380 |
| 4,240,848 | 12/1980 | Barber | 283/82 |
| 4,288,689 | 9/1981 | Lemelson et al. | 235/435 |
| 4,333,072 | 6/1982 | Beigel | 340/825.54 |
| 4,535,557 | 8/1985 | Porcher | 40/300 |
| 4,675,669 | 6/1987 | Goldman | 283/72 |
| 4,816,654 | 3/1989 | Anderl et al. | 235/382 |
| 4,816,824 | 3/1989 | Katz et al. | 283/72 |
| 5,030,807 | 7/1991 | Landt et al. | 235/375 |
| 5,151,684 | 9/1992 | Johnsen | 340/572 |
| 5,153,842 | 10/1992 | Blugos, Sr. et al. | 364/478 |
| 5,202,550 | 4/1993 | Kocznar et al. | 235/382 |
| 5,206,495 | 4/1993 | Kreft | 235/487 |
| 5,239,167 | 8/1993 | Kipp | 235/383 |

FOREIGN PATENT DOCUMENTS

| | | |
|---|---|---|
| 0 620 5377 | 10/1994 | European Pat. Off. . |
| 34 35 506 | 4/1996 | Germany . |
| 2 257 278 | 1/1993 | United Kingdom . |
| WO 93 24902 | 12/1993 | WIPO . |

*Primary Examiner*—Deborah Jones
*Assistant Examiner*—Cathy F. Lam
*Attorney, Agent, or Firm*—Paul W. Martin

[57] ABSTRACT

A product label containing information about a merchandise item which can be exchanged with a terminal or server. In its simplest form, the product label includes a memory and a connector coupled to the memory. In another form intended to be inaccessible to a user of the item, it includes a memory, a processor, a transceiver, and a power supply. In yet another form intended to be accessible to a user of the item, it includes a memory, a processor, a transceiver, a power supply, and a display. The product label is permanently affixed to the merchandise item. The stored information may include purchase and exchange information, as well as instructions for use.

8 Claims, 2 Drawing Sheets

FIG. 2
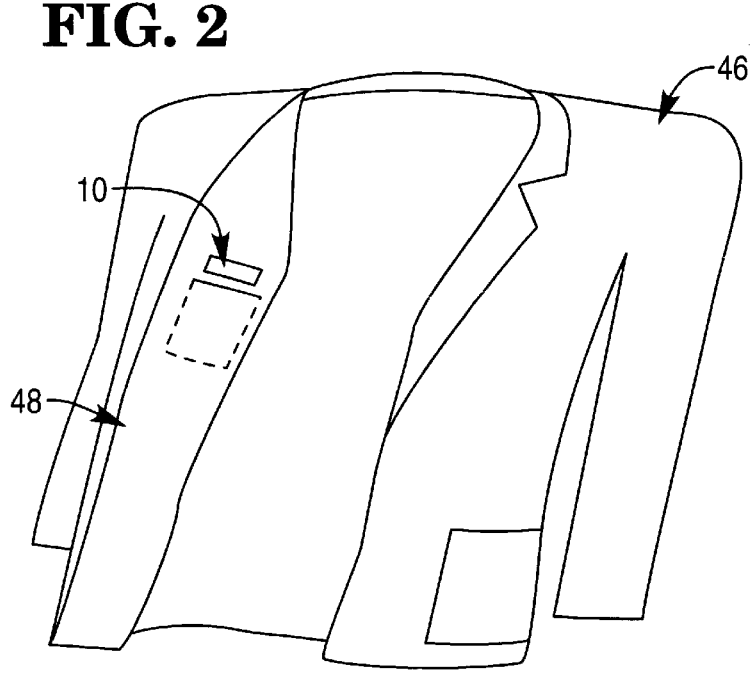
FIG. 3
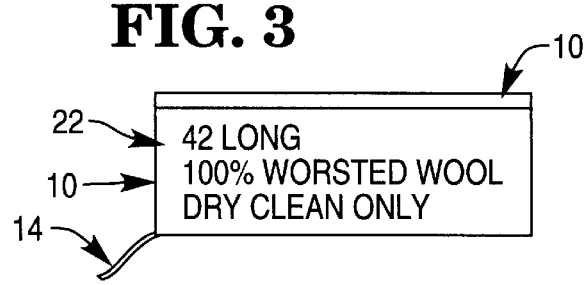
42 LONG
100% WORSTED WOOL
DRY CLEAN ONLY
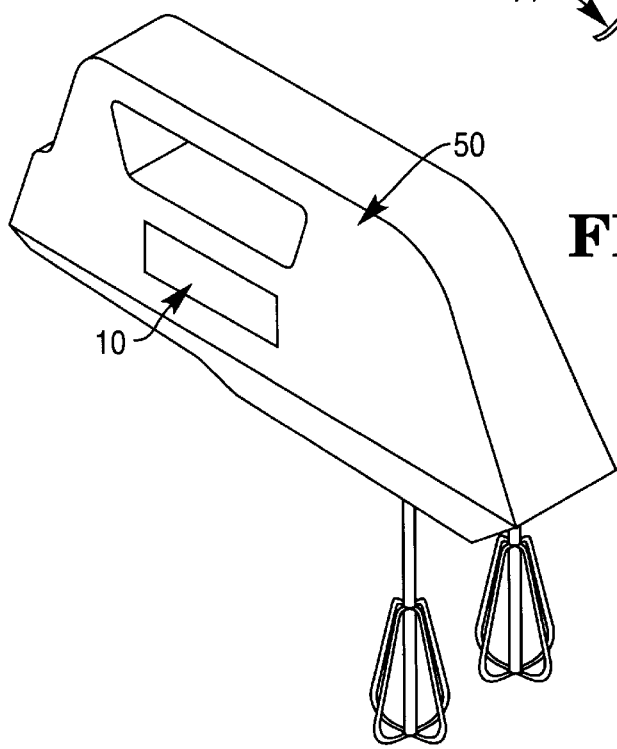
FIG. 4

MULTIPLE FUNCTION INTERACTIVE PRODUCT LABEL

BACKGROUND OF THE INVENTION

The present invention relates to product labels, and more specifically to a multiple function interactive product label (MFIPL).

Current product labels or tags are typically of two types, those that remain on a product during use of the product by a consumer, and those that are discarded after purchase. Both types of labels have only limited functions and provide only limited information. Those permanently remaining with the product typically do not identify the name and location of the store where the product was purchased, the price paid, the purchaser's name, or other data which could be useful to know about the product after it is sold to the consumer. Such information would be valuable to retailers that allow merchandise to be returned.

Additional tags or labels are required by the manufacturer and others involved in the distribution chain to track the progress and associated financial performance of the product through the distribution process. The additional tags require time-consuming steps such as tag attachment and detachment. More importantly, the information provided by the tags to the distribution channel is incomplete. At a retail point-of-sale, usually only the type of item sold is recorded, not the specific item itself. Therefore, it is usually not possible to do a perpetual inventory and to track the exact costs associated with each item leaving the store.

Therefore, it would be desirable to provide a single product marking device that contains specific information about each item, that allows the information to be updated, and that stays with the product throughout the life of the product.

SUMMARY OF THE INVENTION

In accordance with the teachings of the present invention, a multiple function interactive product label is provided. The product label contains information about a merchandise item which can be exchanged with a terminal or server. In its simplest form, the product label includes a memory and a connector coupled to the memory. In another form intended to be inaccessible to a user of the item, it includes a memory, a processor, a transceiver, and a power supply. In yet another form intended to be accessible to a user of the item, it includes a memory, a processor, a transceiver, a power supply, and a display. The product label is permanently affixed to the merchandise item. The stored information may include purchase and exchange information, as well as instructions for use.

It is accordingly an object of the present invention to provide a multiple function interactive product label.

It is another object of the present invention to provide a multiple function interactive product label which contains purchase, exchange, and other historical information about an item.

It is another object of the present invention to provide a multiple function interactive product label which contains information about the use and care of an item for display to a user of the item.

It is another object of the present invention to provide a multiple function interactive product label which is permanently affixed to the item.

It is another object of the present invention to provide a multiple function interactive product label which prevents theft by providing information about payment to a server before the item leaves a retail establishment.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings in which:

FIG. 2 is an illustration of an article of clothing which has a MFIPL;

FIG. 3 is a detailed view of the MFIPL of FIG. 2; and

FIG. 4 is an illustration of an appliance which has a MFIPL.

DETAILED DESCRIPTION OF THE PREFERRED EMBODIMENT

Figure 1:
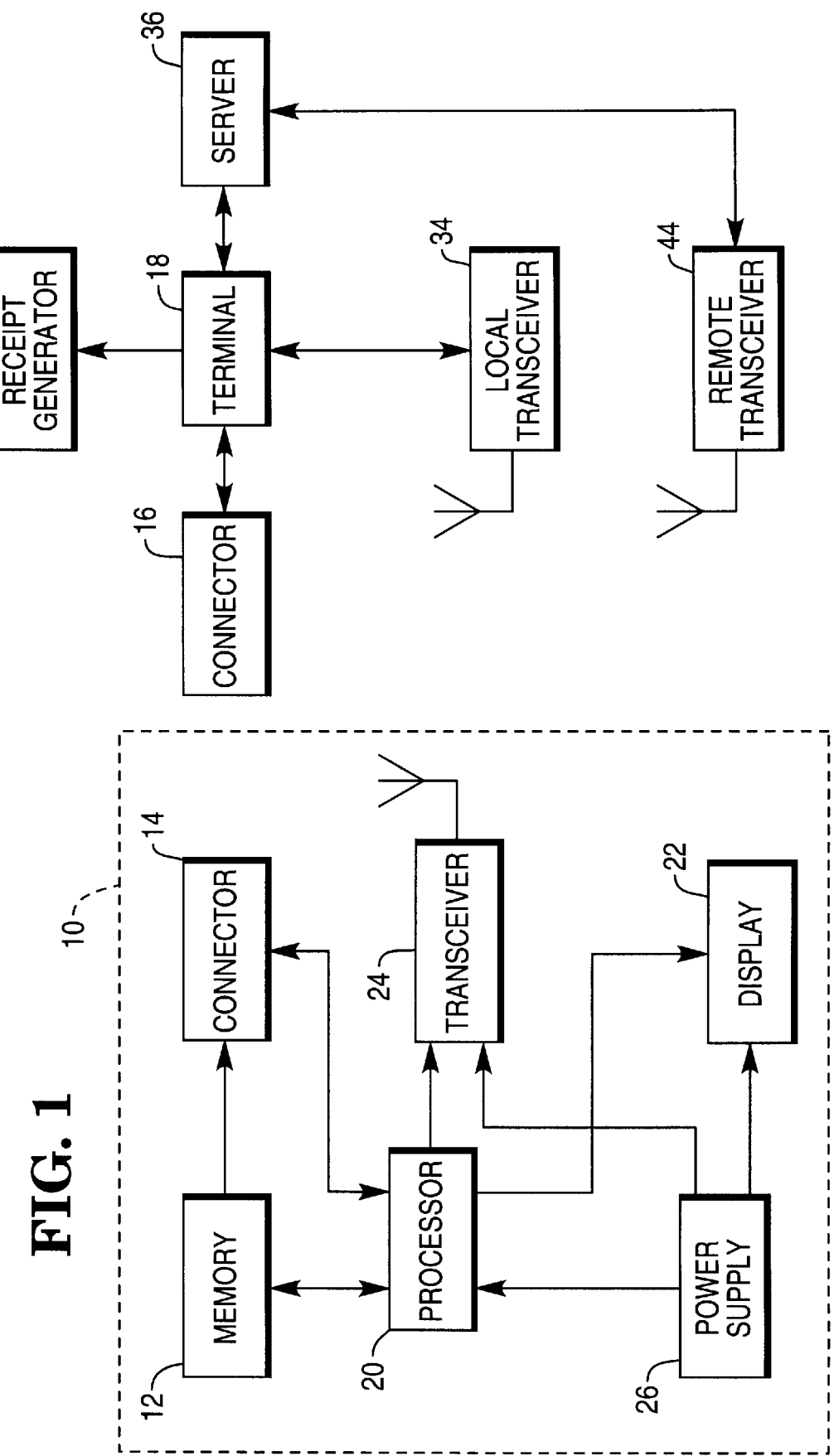
FIG. 1 is a block diagram of a system employing the multiple function interactive product label (MFIPL)

Referring now to FIG. 1, multiple function interactive product label (MFIPL) 10 primarily includes memory 12, which stores information about a product to which MFIPL 10 is attached. The information may include the product's inventory number, the date and location of purchase, the purchase price, and return information. Price tagging is an effective feature, especially where the price is unique, as when the product is damaged or when the product is priced according to unique attributes or some varying measure such as weight. Memory 12 is preferably a static memory, such as a flash RAM.

Information may be stored and retrieved from memory 12 through connector 14, which couples to another connector 16 at a point-of-service (POS) terminal 18.

MFIPL 10 may also include processor 20, display 22, transceiver 24, and power supply 26.

Processor 20 allows MFIPL 10 to perform more complex functions and controls operation of MFIPL 10. Memory 12 is large enough to store programs and data received over the life of MFIPL 10.

Display 22 allows the contents of memory 12 to be viewed independently of POS terminal 18. In addition to the information listed above, information such as size, expiration date, possible defects, and instructions for recommended use may also be stored and displayed.

Transceiver 24 allows MFIPL 10 to receive and transmit data and control signals to POS terminal 18. Each MFIPL 10 detects messages intended for it from local transceiver 34, which is coupled to terminal 18 or from remote transceiver 44 which is located at an exit and coupled to server 36. Product data is read from and written to MFIPL 10 by moving the product across a designated reading/writing area 38 where transceiver 34 communicates with MFIPL 10. Many like products may be marked at the same time during distribution or sales by passing a package or cart containing the products over a similar read/write area.

Power supply 26 preferably is capable of providing power during the entire useful life of the product. Power supply 26 may be a battery source, solar source, or household current with backup source for products which remain plugged into household electrical outlets. Connector 14 may be used to recharge power supply 26, when other means of maintaining sufficient power are unavailable.

MFIPL 10 responds at local checkout counter transceiver 34 or remote transceiver 44 to a transmission requesting to know the status of the product. If at the checkout counter, a customer's account number from a credit card, debit card, or SMART card is recorded by MFIPL 10, and the product is marked as belonging to that customer. A receipt generator 38 on terminal 18 creates a receipt once successful communications has occurred and the transaction recorded for that customer. If at an exit, display 22 on MFIPL 10 indicates to a customer that payment has been verified for that product.

The benefits of the multiple function interactive product label are:

(1) Reduced labor in the distribution of the product, resulting in lower product cost.

(2) Improved financial information (including ownership) and tracking of products through the distribution chain.

(3) Accurate return transactions without the need to save additional tags or paperwork.

(4) More cost-effective use of products by the customer, through interactions between the multiple function interactive product labels and interacting entities associated with care and use (e.g., home care appliances irons, washers and dryers).

Turning now to FIGS. 2 and 3, a version of MFIPL 10 is shown on a coat 46. Here, MFIPL 10 is made using well-known flexible circuit technology. MFIPL 10 stores and displays data such as the size, fabric content, and cleaning instructions of coat 46. MFIPL 10 may be mounted on the inside lining 48 or in a place hidden from the wearer.

MFIPL 10 is preferably a permanent fixture associated with a product throughout its life. As MFIPL 10 passes through a product's distribution chain, each point in the chain adds or changes data for the product. Preferably, MFIPL 10 is attached in a location where it does not interfere with normal product use. Furthermore, MFIPL 10 is made of materials which make it durable, but which prevent its presence from being obtrusive to the user of the product. MFIPL 10 is integrated into a product or attached securely enough to a product so that removal without a special tool would cause obvious damage to the product. In addition, MFIPL 10 may be programmed to provide security for the data stored in memory 12.

Turning now to FIG. 4, MFIPL 10 is attached to an appliance 50. Here, MFIPL 10 replaces both temporary tags and electronic shelf labels, if installed. In addition to price, MFIPL 10 may indicate product operating status, e.g., whether appliance 50 needs fixing.

In this embodiment, MFIPL 10 may be integrated into the design and manufacture of a product. During the lifetime of a product, MFIPL 10 may assist the user in using and caring for the product. For example, a washing machine could have a local transmitter/receiver 24 designed to read laundry data from MFIPL's attached to clothing and linens. As a product was dropped into the washing machine, the machine would read this information from the product and compare it to the machine cycle settings for this load of laundry, and to the information read from prior laundry already dropped into the machine. If all prior items loaded into the washing machine had been "cold—dark colors" and this item was "warm—light colors" then the machine could alert the user of this conflict, so that the user could take a different action if desired.

Similarly, MFIPL 10 may assist in directing proper product usage by the customer. For example, suppose the product was an appliance. If the customer did not understand how to operate a feature on this appliance, then they could call a "help" number displayed by MFIPL 10. Perhaps this number would be displayed on MFIPL 10 when the customer pressed a "help" button, or it could be displayed automatically when the appliance itself recognized a problem situation (e.g., a short circuit). In either case, when the customer reached the "help" service, they might be instructed to hold the telephone hand set next to MFIPL 10, and the transmission of product identification data and problem analysis data would occur, from MFIPL 10 to the "help" service via a local transmitter/receiver in the hand set.

Finally, MFIPL 10 could signal to the user the logical end of the product's lifetime. It could indicate, for example, an expiration date, or it could be used to display a fatal problem (e.g., loose connection) detected by circuitry in the product designed for that purpose. This circuitry would interact with MFIPL 10 via connector 14.

Although the present invention has been described with particular reference to certain preferred embodiments thereof, variations and modifications of the present invention can be effected within the spirit and scope of the following claims.

What is claimed is:

1. A label for a merchandise item comprising:

an electronic memory containing a permanent record of information about the item;

wherein the memory is permanently affixed to the merchandise item.

2. The label as recited in claim 1, further comprising:

a processor coupled to the memory.

3. The label as recited in claim 2, further comprising:

a transceiver coupled to the memory and the processor.

4. The label as recited in claim 3, further comprising a display coupled to the processor for displaying the information about the item to a user of the item.

5. The label as recited in claim 4, wherein the memory, the transceiver, and the processor are inaccessible to a user of the item.

6. A label for a merchandise item comprising:

an electronic memory containing a permanent record of information about the item, including a static memory, and a connector coupled to the static memory;

wherein the electronic memory is permanently affixed to the merchandise item.

7. A label for a purchased merchandise item comprising:

an electronic memory containing a permanent record of information about the item, including a store identifier for the item, a purchase price for the item, and a date of purchase for the item;

wherein the electronic memory is an integral part of the purchased merchandise item.

8. The label as recited in claim 7, wherein the electronic memory also contains a purchase location for the item.

\* \* \* \* \*